United States Patent
Anagawa et al.

(10) Patent No.: US 8,233,237 B2
(45) Date of Patent: Jul. 31, 2012

(54) PERPENDICULAR MAGNETIC WRITE HEAD AND MAGNETIC RECORDING DEVICE

(75) Inventors: Kenkichi Anagawa, Toyko (JP); Katsuki Kurihara, Toyko (JP); Takeo Kagami, Toyko (JP); Kei Hirata, Toyko (JP); Minoru Ota, Toyko (JP)

(73) Assignee: TDK Corporation, Tokyo (JP)

( * ) Notice: Subject to any disclaimer, the term of this patent is extended or adjusted under 35 U.S.C. 154(b) by 64 days.

(21) Appl. No.: 12/819,552

(22) Filed: Jun. 21, 2010

(65) Prior Publication Data
US 2011/0310510 A1    Dec. 22, 2011

(51) Int. Cl.
*G11B 5/31* (2006.01)
(52) U.S. Cl. ...................................... 360/125.3
(58) Field of Classification Search ............... 360/125.3
See application file for complete search history.

(56) References Cited

U.S. PATENT DOCUMENTS

| 6,624,972 | B1 | 9/2003 | Nishida et al. |
| 7,230,793 | B2 | 6/2007 | Im |
| 7,379,276 | B2 | 5/2008 | Im et al. |
| 7,394,620 | B2 | 7/2008 | Taguchi |
| 7,467,461 | B2 * | 12/2008 | Bonhote et al. ............ 29/603.16 |
| 7,777,989 | B2 * | 8/2010 | Sun et al. ................. 360/125.12 |
| 7,793,406 | B2 * | 9/2010 | Zheng ........................ 29/603.16 |
| 7,808,742 | B2 * | 10/2010 | Kamijima et al. ....... 360/125.02 |
| 7,898,773 | B2 * | 3/2011 | Han et al. ...................... 360/319 |
| 8,031,433 | B2 * | 10/2011 | Yan et al. ................. 360/125.03 |

FOREIGN PATENT DOCUMENTS

| JP | A-2004-234830 | 8/2004 |
| JP | A-2004-326990 | 11/2004 |
| JP | B2-3640296 | 4/2005 |
| JP | B2-4044922 | 2/2008 |

\* cited by examiner

*Primary Examiner* — Mark Blouin
(74) *Attorney, Agent, or Firm* — Oliff & Berridge, PLC

(57) ABSTRACT

A main magnetic-pole layer is provided with, at the tip end portion thereof, a trailing shied on the trailing side via a non-magnetic gap layer, and the non-magnetic gap layer includes therein one or more magnetic layers. This magnetic layer appropriately controls the amount of magnetic fluxes coming from the tip end portion of the main magnetic-pole layer for capturing into the trailing shield because the magnetic fluxes coming from the tip end portion of the main magnetic-pole layer go through the magnetic layer before being captured into the trailing shield.

6 Claims, 12 Drawing Sheets

PERPENDICULAR MAGNETIC WRITE HEAD AND MAGNETIC RECORDING DEVICE

BACKGROUND OF THE INVENTION

1. Field of the Invention

The present invention relates to a perpendicular magnetic write head provided with a magnetic pole and a write shield, and a magnetic recording device incorporating the head.

2. Description of the Related Art

Due to the recent increase of the areal recording density of a magnetic recording medium (hereinafter, referred to as "recording medium") typified by a hard disk, there is a demand for the better performance capabilities of a magnetic write head. In order to meet such a demand, as an alternative to the longitudinal magnetic recording mode that has been the recording mode for the magnetic write head, the perpendicular magnetic recording mode is now receiving attention. With the longitudinal magnetic recording mode, the direction of a signal magnetic field is set to be in the in-plane direction of a recording medium, and with the perpendicular magnetic recording mode, the direction thereof is set to intersect with the plane thereof. This is due to advantages of a higher linear recording density, and less susceptibility to thermal fluctuations for any recording medium completed with recording.

A magnetic write head of such a perpendicular magnetic recording mode (hereinafter, referred to as "perpendicular magnetic write head") is provided with a main magnetic-pole layer for use to direct, to a recording medium, any magnetic fluxes generated by a thin-film coil. This main magnetic-pole layer includes a tip end portion (magnetic pole) of a very narrow width for generation of a magnetic field (perpendicular magnetic field) for recording use through emission of the magnetic fluxes.

As to the configuration of such a perpendicular magnetic write head, various different studies have been in progress for the purpose of increasing the perpendicular magnetic field in intensity and gradient, for example.

In a specific configuration, for an increase of the gradient of the magnetic field in a direction intersecting a track-width direction (cross-track direction), i.e., down-track direction, a first soft magnetic film is provided. The first soft magnetic film is narrow in width, and is disposed between a main magnetic pole also narrow in width and a second soft magnetic film wide in width. The first soft magnetic film is coupled to the second soft magnetic film with a distance from the main magnetic pole via a first non-magnetic film (an example includes Japanese Unexamined Patent Publication No. 2007-035082). This configuration also includes a pair of third soft magnetic films for an increase of the gradient of the magnetic field in the cross-track direction. These third soft magnetic films are disposed respectively on both sides of the main magnetic pole in the cross-track direction with a distance therefrom each via a second non-magnetic film.

For protection of any recorded signals from possible deletion or others by any leakage magnetic field, the narrow tip end portion is located via a gap on the trailing side of a main magnetic pole together with an auxiliary magnetic pole wide in width. The auxiliary magnetic pole is being inserted with a non-magnetic layer (an example includes Japanese Unexamined Patent Publication No. 2004-326990).

For reduction of any magnetic field being a cause of noise generation in a recording medium, first and second shield layers are provided on the trailing side of a recording pole. These first and second shield layers are so disposed as to be away from the recording pole via an insulation layer on the side closer to an air bearing surface, and to be coupled to the recording pole on the side away from the air bearing surface (an example includes Japanese Patent No. 4044922).

For reduction of any leakage magnetic field, a narrow laminate is provided between first and second poles, which are both narrow in width (an example includes Japanese Unexamined Patent Publication No. 2004-234830). This laminate includes an insulation medium inserted into an anisotropic medium having the magnetic anisotropy.

As a related technology, in a longitudinal magnetic write head, for prevention of blurring in writing and for achievement of satisfactory overwriting, a narrow laminate is provided between upper and lower magnetic poles, which are both wide in width (an example includes U.S. Pat. No. 6,624, 972). This laminate includes a lower sub magnetic pole, a first non-magnetic film, a soft magnetic film, a second non-magnetic film, and an upper sub magnetic pole, which are laminated in order from the side closer to the lower magnetic pole.

The concern here is that the areal recording density of a recording medium is increasing all the more, and thus the development work has been in progress for a perpendicular magnetic write head that may keep up with the increase of the areal recording density. However, increasing the intensity of a perpendicular magnetic field is in a relationship of trade-off with increasing the gradient thereof, and such an attempt is difficult to be achieved.

As such, achieving such an attempt of increasing the intensity and gradient of a perpendicular magnetic field at the same time is very much expected.

SUMMARY OF THE INVENTION

A perpendicular magnetic write head of the invention is provided with a write shield provided to a magnetic pole via a non-magnetic gap layer, and the non-magnetic gap layer is provided therein with one or more magnetic layers. A magnetic recording device of the invention is provided with a magnetic recording medium and a perpendicular magnetic write head, and the perpendicular magnetic write head is of a configuration similar to the perpendicular magnetic write head of the invention described above.

According to the perpendicular magnetic write head or the magnetic recording device of the invention, a magnetic pole is provided with a write shield via a non-magnetic gap layer, and the non-magnetic gap layer is provided therein with one or more magnetic layers. Such a configuration enables appropriate control over the amount of magnetic fluxes coming from the magnetic pole for capturing into the write shield so that the perpendicular magnetic field may be increased in intensity and gradient at the same time.

DETAILED DESCRIPTION OF THE PREFERRED EMBODIMENTS

Configuration of Thin-Film Magnetic Head

FIGS. 1A, 1B, 2, and 3 each show the configuration of a thin-film magnetic head including a perpendicular magnetic write head in an embodiment of the invention.

Figures 1A, 1B:
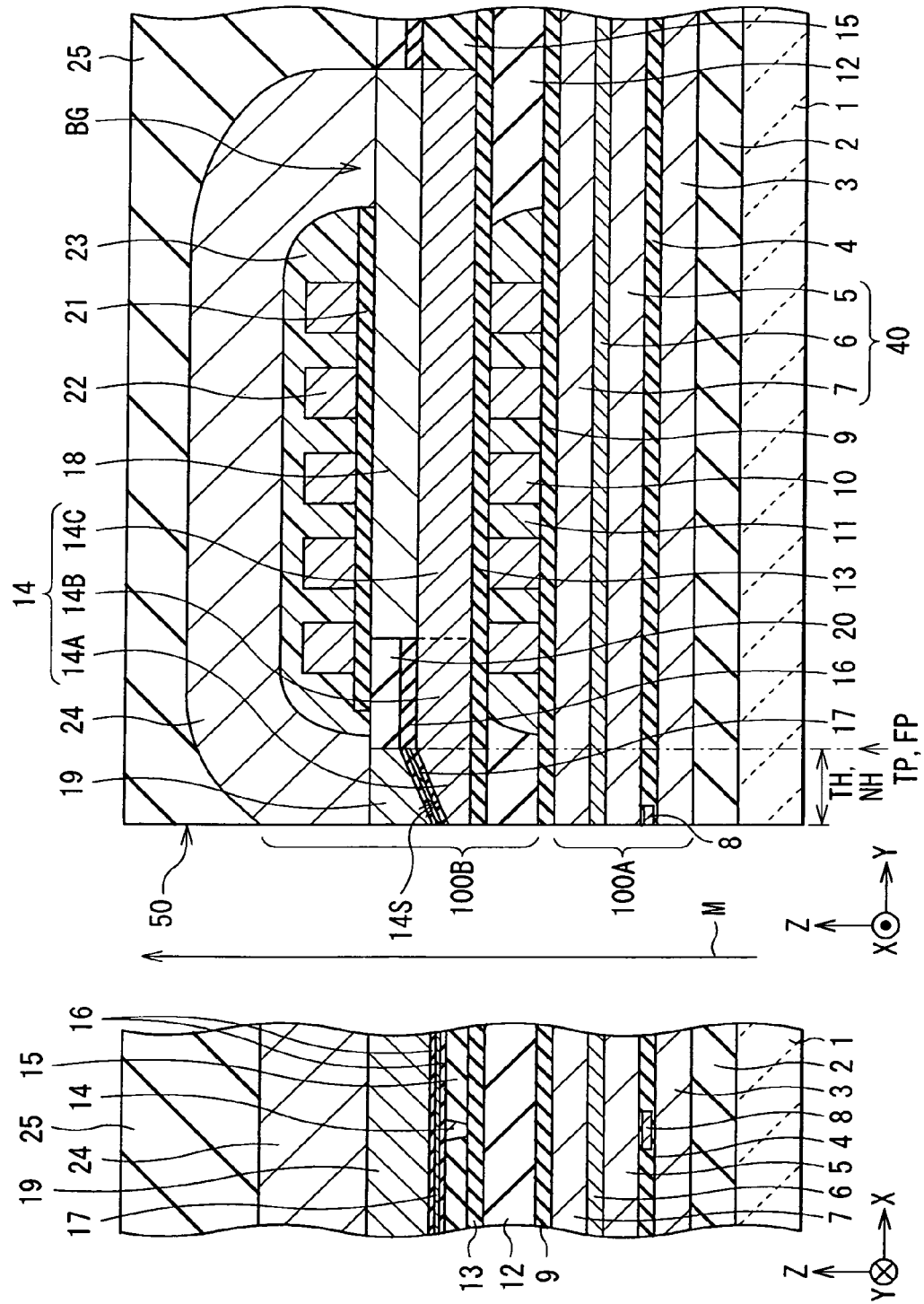
FIGS. 1A and 1B are each a cross-sectional view of a thin-film magnetic head using a perpendicular magnetic write head in an embodiment of the invention, showing the configuration thereof.
Figure 2:
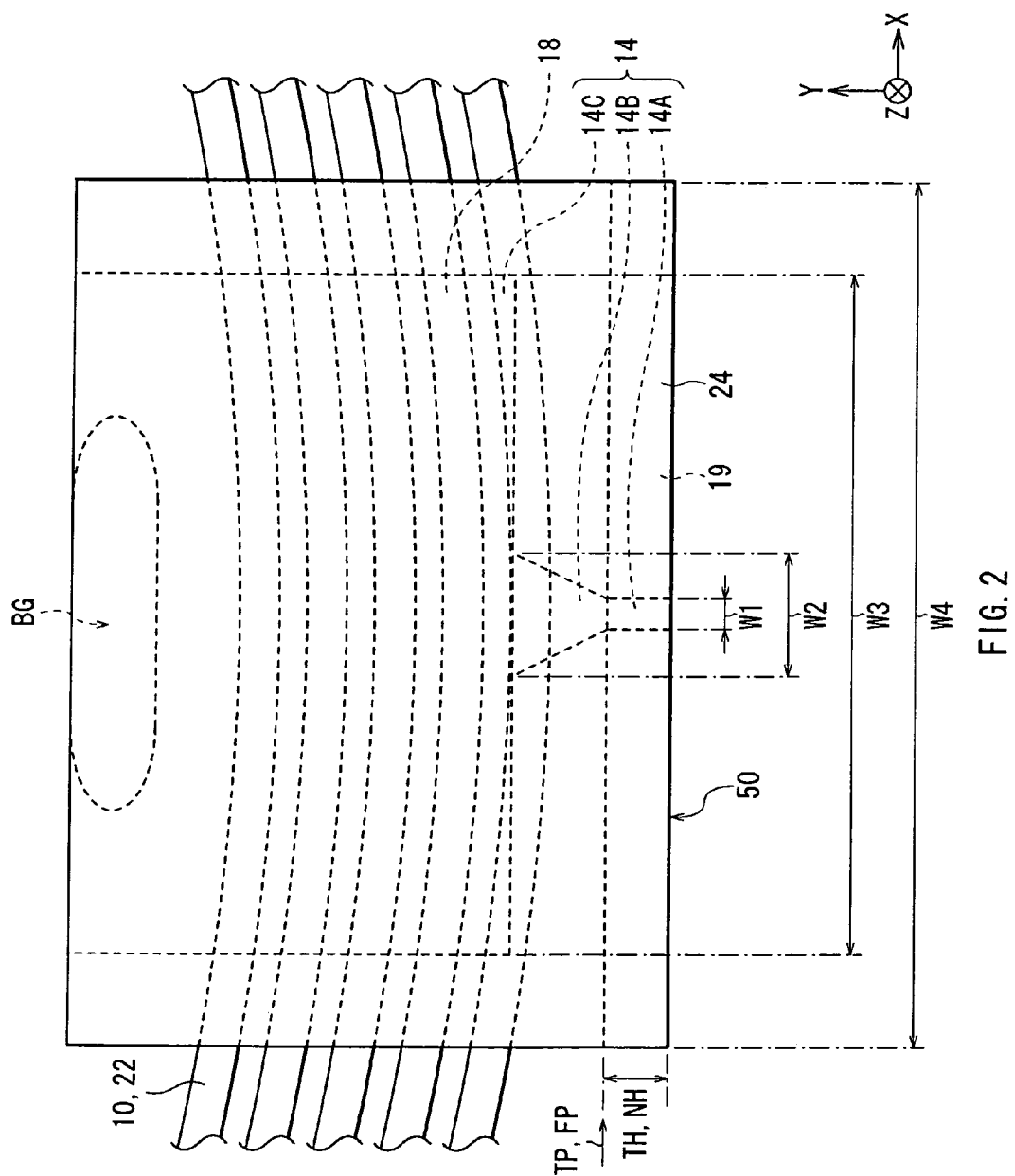
FIG. 2 is a plan view of the main part of the thin-film magnetic head, showing the configuration thereof.
Figure 3:
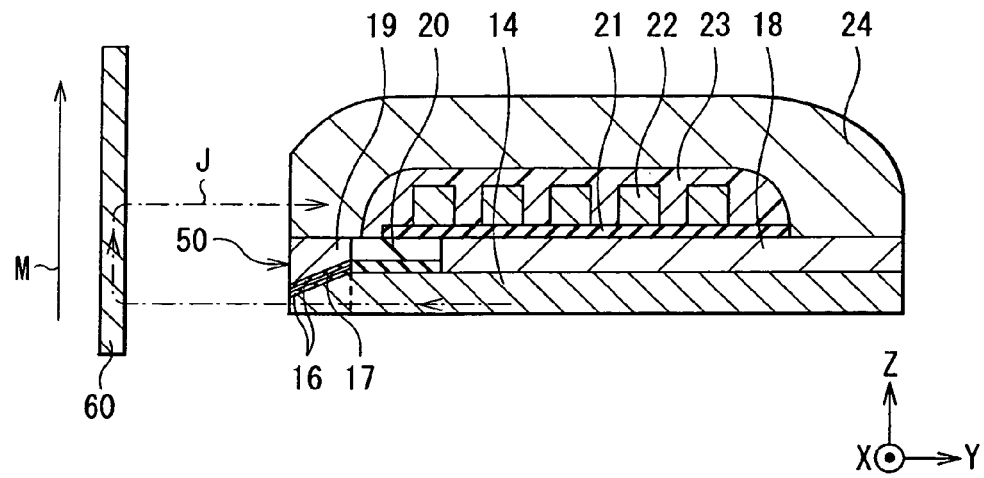
FIG. 3 is a cross-sectional view of the thin-film magnetic head and a recording medium, showing the relationship therebetween.

To be specific, FIGS. 1A and 1B each show the entire cross-sectional configuration, and FIG. 2 shows the configuration of the main part in a planar view. FIG. 3 illustrates the relationship between the thin-film magnetic head and a recording medium 60. FIG. 1A is showing the cross section parallel to an air bearing surface 50, and FIG. 1B is showing the cross section perpendicular to the air bearing surface 50. FIG. 2 is showing the plan view viewed from the Z-axis direction. Herein, an upward arrow M in FIGS. 1A and 1B, and 3 indicates the moving direction of the recording medium 60 relative to the thin-film magnetic head.

In the description below, the dimensions in the X-axis direction, the Y-axis direction, and the Z-axis direction are respectively referred to as "width", "length", and "thickness". In the Y-axis direction, the side near the air bearing surface 50 is referred to as "front", and the side away therefrom as "rear". In the direction of the arrow M, the side toward the front is referred to as "trailing side", and the side toward the rear as "leading side". The X-axis direction is referred to as "cross-track direction", and the Z-axis direction as "down-track direction".

The thin-film magnetic head in this description is the one for executing a magnetic process to the recording medium 60 such as hard disk, and is a combined head capable of both a reproduction process and a recording process, for example.

Such a thin-film magnetic head is exemplarily in the configuration of FIGS. 1A and 1B, for example, including an insulation layer 2, a reproduction head section 100A, a separation layer 9, a write head section 100B, and an overcoat layer 25, which are laminated together on a substrate 1 in this order. The configuration also includes the air bearing surface 50, which serves as one side surface for all of these components above.

The substrate 1 is made of a ceramic material including AlTiC (Al$_2$O$_3$.TiC), for example. The insulation layer 2, the separation layer 9, and the overcoat layer 25 are each made of a non-magnetic insulation material including aluminum oxide (AlO$_x$), for example, and this aluminum oxide is exemplified by alumina (Al$_2$O$_3$).

The reproduction head section 100A is in charge of executing a reproduction process utilizing the Magneto-Resistive effect (MR: magneto-resistive effect). Such a reproduction head section 100A is laminated thereon with, in this order, a lower lead shield layer 3, a shield gap layer 4, and an upper lead shield layer 40, for example. In this shield gap layer 4, a reproduction element (MR element 8) is embedded in such a manner that an end surface thereof is exposed to the air bearing surface 50.

The lower and upper lead shield layers 3 and 40 are those provided for magnetically separating the MR element 8 from the area therearound, and are extending from the air bearing surface 50 toward the rear. The lower lead shield 3 is made of a magnetic material including alloy of nickel and iron (NiFe), for example. The alloy of nickel and iron is exemplified by permalloy (trade name) in which a nickel content is 80 wt % and an iron content is 20 wt %, for example. The upper lead shield layer 40 is a laminate of magnetic layers 5 and 7 with a non-magnetic layer 6 sandwiched therebetween. The magnetic layers 5 and 7 are each also made of a magnetic material such as permalloy, and the non-magnetic layer 6 is made of a non-magnetic conductive material such as ruthenium (Ru) or a non-magnetic insulation material such as alumina. Alternatively, the upper lead shield layer 40 may be made of a magnetic material and in a single-layer structure.

The shield gap layer 4 is for electrically separating the MR element 8 from the area therearound, and is made of a non-magnetic insulation material such as alumina. Such an MR element 8 is the one performing a reproduction process by utilizing the Giant Magneto-Resistive effect (GMR: giant magneto-resistive effect) or the Tunneling Magneto-Resistive effect (TMR: tunneling magneto-resistive effect), for example.

The write head section 100B is a perpendicular magnetic write head that performs a recording process in the perpendicular magnetic recording mode. This write head section 100B is configured to include a thin-film coil 10 embedded in coil insulation layers 11 to 13, a main magnetic-pole layer 14, an insulation layer 15, a non-magnetic gap layer 16, a magnetic layer 17, an auxiliary magnetic-pole layer 18, a trailing shield layer 19, an insulation layer 20, a thin-film coil 22 embedded in coil insulation layers 21 and 23, and a return yoke 24, which are laminated in this order, for example.

The thin-film coil 10 is provided mainly for generating magnetic fluxes for leakage prevention use to prevent any recording-use magnetic fluxes generated in the thin-film coil 22 from reaching (leaking to) the reproduction head section 100A unexpectedly. Such a thin-film coil 10 is made of a highly-conductive material including copper (Cu), for example, and is in a spiral configuration in which winding turns are made around a back gap BG. Note that the thin-film coil 10 is not restricted in the number of winding turns (the number of turns), but the number of winding turns is preferably the same as the number of turns of the thin-film coil 22.

The coil insulation layers 11 to 13 are for electrically separating the thin-film coil 10 from the area therearound. The coil insulation layer 11 is provided to a clearance formed between or around the winding turns of the thin-film coil 10, and is made of a non-magnetic insulation material such as photoresist or Spin On Glass (SOG; Spin On Glass) that flows when it is heated, for example. The coil insulation layer 12 is provided around the coil insulation layer 11, and the coil insulation layer 13 is so provided as to cover the thin-film coil 10, and the coil insulation layers 11 and 12. The coil insulation layers 12 and 13 are each made of a non-magnetic insulation material such as alumina.

The main magnetic-pole layer 14 is mainly for leading the magnetic fluxes generated in the thin-film coil 22 to the recording medium 60. The main magnetic-pole layer 14 is extending from the air bearing surface 50 toward the rear. Such a main magnetic-pole layer 14 is made of a magnetic material with a high saturation magnetic flux density such as iron alloy, for example. Such an iron alloy includes alloy of iron and cobalt (FeCo), or alloy of iron, cobalt, and nickel (FeCoNi), for example.

The main magnetic-pole layer 14 is shaped substantially like a paddle in a planar view as exemplarily shown in FIG. 2. If this is the shape, the main magnetic-pole layer 14 includes a tip end portion 14A, an intermediate portion 14B, and a rear end portion 14C in order from the side of the air bearing surface 50. The tip end portion 14A has a fixed width W1 with which a recording track is defined by width. The intermediate portion 14B is increased in width gradually from the width W1 to a width W2. The rear end portion 14C has a fixed width W3 wider than the width W2. This tip end portion 14A is a part (magnetic pole) where the perpendicular magnetic field is generated through emission of the magnetic fluxes. The width W3 of the rear end portion 14C is longer than the length thereof, e.g., the rear end portion 14C is in the shape of a horizontal rectangle, for example. The position where the main magnetic-pole layer 14 is increased in width from the width W1 is at a so-called flare point FP.

The main magnetic-pole layer 14 may be uniform in thickness in its entirety or may vary in thickness. In this example, the intermediate portion 14B and the rear end portion 14C are each uniform in thickness but the tip end portion 14A is thinner toward the air bearing surface 50. This provides a slanted surface 14S (tapered surface) on the trailing side of the tip end portion 14A.

The insulation layer 15 is for electrically separating the main magnetic-pole layer 14 from the area therearound, and is made of a non-magnetic insulation material such as alumina.

The non-magnetic gap layer 16 is provided therein with a magnetic layer 17. This non-magnetic layer 16 is adjacent to the main magnetic-pole layer 14, and is extended from the air bearing surface 50 toward the rear, e.g., extended until it is adjacent to the auxiliary magnetic-pole layer 18. The non-magnetic gap layer 16 is made of a non-magnetic insulation material such as alumina.

The magnetic layer 17 is separated from the main magnetic-pole layer 14 and the trailing shield 19 via the non-magnetic gap layer 16. The magnetic layer 17 serves to control the amount of magnetic fluxes coming from the main magnetic-pole layer 14 (specifically, the tip end portion 14A), for capturing into the trailing shield 19. This magnetic layer 17 is formed by a magnetic material similar to that of the main magnetic-pole layer 14, for example, but may be formed by any different magnetic material. This possibility of difference of material from the main magnetic-pole layer 14 is applicable also to the auxiliary magnetic-pole layer 18, the trailing shield 19, and the return yoke 24, which will be described later.

The auxiliary magnetic-pole layer 18 serves as an auxiliary part for carrying therein any magnetic fluxes for a supply thereof to the main magnetic-pole layer 14. Such an auxiliary magnetic-pole layer 18 is made of a magnetic material similar to that of the main magnetic-pole layer 14, for example. This auxiliary magnetic-pole layer 18 is located on the trailing side of the main magnetic-pole layer 14 and is extending toward the rear from the position behind the air bearing surface 50, and then is coupled to the main magnetic-pole layer 14, for example. The auxiliary magnetic-pole layer 18 is shaped rectangular in a planar view with the width W3 as shown in FIG. 2, for example.

The trailing shield 19 is a write shield for capturing magnetic fluxes in the vicinity of the air bearing surface 50 coming from the main magnetic-pole layer 14, and for preventing divergence of the magnetic fluxes on the trailing side of the main magnetic-pole layer 14. Such a trailing shield 19 accordingly increases the gradient of the perpendicular magnetic field in the down-track direction, reduces the width of the recording track, and provides the perpendicular magnetic field with any skewed magnetic field component.

Such a trailing shield 19 is disposed between the main magnetic-pole layer 14 and the return yoke 24. Specifically, the trailing shield 19 is disposed with a distance from the main magnetic-pole layer 14 via the non-magnetic gap layer 16, and is formed separately from the return yoke 24. The trailing shield 19 is extended from the air bearing surface 50 toward the rear, e.g., extended until it reaches the flare point FP. With such a configuration, the trailing shield 19 is adjacent to the insulation layer 20 in the rear, thereby functioning to define the forefront end position of the insulation layer 20 (throat height zero position TP). Herein, the trailing shield 19 is made of a magnetic material similar to that of the main magnetic-pole layer 14, and as shown in FIG. 2, is shaped rectangular in a planar view with a fixed width W4 wider than the width W3, for example.

The insulation layer 20 is for defining a throat height TH, and is disposed around the auxiliary magnetic-pole layer 18. The forefront end position of this isolation layer 20 located between the auxiliary magnetic-pole layer 18 and the write shield layer 19 is the throat height zero position TP as described above, and this throat height zero position TP is away from the air bearing surface 50 by the throat height TH. This insulation layer 20 is made of a non-magnetic insulation material such as alumina. FIGS. 1B and 2 each show a case where the throat height zero position TP matches the flare point FP.

The thin-film coil 22 is for generating magnetic fluxes for recording use, and in such a thin-film coil 22, a current flow is opposite in direction from that in the thin-film coil 10, for example. The detailed configuration of the thin-film coil 22 is the same as that of the thin-film coil 10, for example.

The coil insulation layers 21 and 23 are both for electrically separating the thin-film coil 22 from the area therearound, and are both coupled to the insulation layer 20. The coil insulation layer 21 is disposed between the auxiliary magnetic-pole layer 18 and the thin-film coil 22, and are both made of a non-magnetic insulation material similar to that of the coil insulation layers 12 and 13, for example. The coil insulation layer 23 is provided between and around the winding turns of the thin-film coil 22, and is made of a non-magnetic isolation material similar to that of the coil insulation layer 11, for example. The forefront ends of the coil insulation layers 21 and 23 are both located behind the forefront end of the insulation layer 20, for example.

The return yoke 24 is mainly for capturing the magnetic fluxes on the way to return to the write head section 100B from the recording medium 60, and for circulating the magnetic fluxes in the write head section 100B and the recording medium 60. Such a function of capturing the magnetic fluxes may not be served only by the return yoke 24 but also by the trailing shield 19. The return yoke 24 is positioned on the trailing side of the auxiliary magnetic-pole layer 18 and that of the trailing shield 19, and is extending from the air bearing surface 50 toward the rear. The return yoke 24 is coupled to the trailing shield 19 in the front thereof, and is coupled to the auxiliary magnetic-pole layer 18 in a back gap BG in the rear. Moreover, the return yoke 24 is made of a magnetic material similar to that of the main magnetic-pole layer 14, and as shown in FIG. 2, is shaped rectangular with the width W4 in a planar view, for example.

Configuration of Main Part of Thin-Film Magnetic Head

Figure 4:
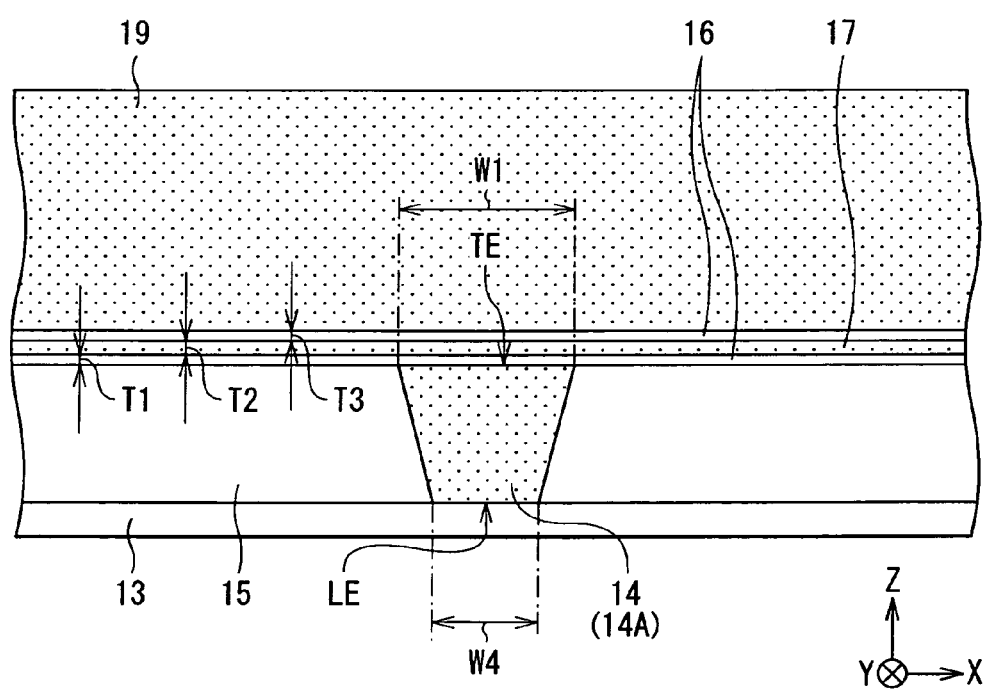
FIG. 4 is a plan view of the main part of the thin-film magnetic head, showing the configuration thereof on an air bearing surface.

Described in detail next is the configuration of the main part of the thin-film magnetic head. FIG. 4 shows the main part of the thin-film magnetic head in a planar view, showing the configuration thereof when it is viewed from the air bearing surface 50. In FIG. 4, for ease of material distinction among the components, any component made of a magnetic material is hatched.

The write head section 100B being a perpendicular magnetic write head includes a magnetic pole, and a write shield. The write shield is the one provided to the magnetic pole via a non-magnetic gap layer. This non-magnetic gap layer includes therein one or more magnetic layers.

In this example, as exemplarily shown in FIG. 4, on the trailing side of the tip end portion 14A being a magnetic pole, the trailing shield 19 being a write shield is provided via the non-magnetic gap layer 16, and the non-magnetic gap layer 16 includes therein the magnetic layer 17.

The magnetic layer 17 provided as such in the non-magnetic gap layer 16 is located in an area at least opposing the tip end portion 14A. In this example, the magnetic layer 17 is disposed not only within such an area opposing the tip end portion 14A but also to extend to the outside of the area in the cross-track direction, and is inserted into the non-magnetic gap layer 16.

Note here that, as to the portion of the non-magnetic gap layer 16 carrying therein the magnetic layer 17, there is no specific restriction on thicknesses T1 and T3 of the non-magnetic gap layer 16, and thickness T2 of the magnetic layer 17. However, the thicknesses T1 to T3 are to be so determined that the magnetic layer 17 may appropriately control the amount of magnetic fluxes coming from the main magnetic-pole layer 14 for capturing into the trailing shield 19 by the magnetic fluxes emitted from the main magnetic-pole layer 14 being captured into the magnetic layer 17 via the non-magnetic gap layer 16, and by the magnetic fluxes captured as such into the magnetic layer 17 then being captured into the trailing shield 19 via the non-magnetic gap layer 16. For ensuring the functioning of the magnetic layer 17 described above, the thickness T2 is preferably determined considering the magnetic layer 17 to have a much smaller volume (capacity amount of magnetic flux) than that of the trailing shield 19.

To be specific, the preferable total thickness of the non-magnetic gap layer 16 and the magnetic layer 17 (the total value of the thicknesses T1 to T3) is 300 nm or smaller, and more preferably 200 nm or smaller. The preferable thicknesses T1 and T3 are each 40 nm or smaller, and more preferably 30 nm or smaller, and the preferable thickness T2 is 120 nm or smaller, and more preferably 70 nm or smaller. This is because satisfying such values for the thicknesses favorably leads to the increase of both the intensity and gradient of the perpendicular magnetic field.

In the air bearing surface 50, the tip end portion 14A is so configured that one end surface thereof on the trailing side is wider in width than the other end surface thereof on the leading side. That is, the end surface of the tip end portion 14A is so shaped that the end edge thereof on the trailing side (trailing edge TE) has a width (width W1) wider than a width (width W4) of the end edge on the leading side (leading edge LE), and is in an inverted trapezoid shape, for example. However, the end surface of the tip end portion 14A is not necessarily in an inverted trapezoid shape as such, and may be in any other shape including inverted triangle or rectangle. In this example, the end surface of the tip end portion 14A may have a side-end edge (side edge) being straight, curved, or bent. The trailing edge TE is a substantial recording portion in the tip end portion 14A, and the width W1 thereof is 0.2 μm or smaller, for example.

Operation of Thin-Film Magnetic Head

This thin-film magnetic head is operated as below.

For recording, when the thin-film coil 22 in the write head section 100B is provided with a current flow from an external circuit that is not shown, a magnetic flux J for recording use is generated as shown in FIG. 3. This magnetic flux J is once stored in the main magnetic-pole layer 14 and in the auxiliary magnetic-pole layer 18, and then starts flowing inside of the main magnetic-pole layer 14 toward the tip end portion 14A. At this time, the magnetic flux J is narrowed at the flare point FP, and thus is eventually directed mainly to the vicinity of the trailing edge TE. When this magnetic flux J is emitted to the outside, a perpendicular magnetic field is generated, and by the resulting perpendicular magnetic field, the recording medium 60 is magnetized so that the information recording is magnetically done.

In such a case, a magnetic flux is so generated as to be opposite in direction in the thin-film coils 10 and 22, thereby preventing leakage of the resulting magnetic flux J to the reproduction head section 100A. This accordingly prevents any reduction of the detection accuracy in the MR element 8. Moreover, any information recorded on the recording medium 60 may be also prevented from being deleted unexpectedly due to any unwanted magnetic field resulted from the magnetic flux J being captured into the lower lead shield 3 and the upper lead shield 40.

Especially when the magnetic flux J is emitted from the tip end portion 14A, a part (divergence component) of the magnetic flux J is captured in the trailing shield 19 via the magnetic layer 17, thereby increasing the gradient of the perpendicular magnetic field in the down-track direction. The magnetic flux J captured as such in the trailing shield 19 is supplied again to the main magnetic-pole layer 14 after going through the return yoke 24.

Herein, the magnetic flux J emitted from the main magnetic-pole layer 14 to the recording medium 60 magnetizes the recording medium 60, and then is returned to the return yoke 24 before being supplied again to the main magnetic-pole layer 14. As such, the magnetic flux J is circulated between the write head section 100B and the recording medium 60 so that a magnetic circuit is constructed.

On the other hand, during reproduction, in response to a sense current flowing to the MR element 8 of the reproduction head section 100A, the MR element 8 varies in resistance in accordance with a signal magnetic field in the recording medium 60 for reproduction use. Such a variation of resistance is detected as a voltage change, and thus the information recorded on the recording medium 60 is magnetically reproduced.

Advantages and Effects of Thin-Film Magnetic Head

In the thin-film magnetic head in this embodiment, the trailing shield 19 is provided on the trailing side of the tip end portion 14A via the non-magnetic gap layer 16, and the non-magnetic gap layer 16 includes therein the magnetic layer 17. Accordingly, with the following reasons, the perpendicular magnetic field is ensured to be increased in intensity at the same time as is increasing in gradient.

Figure 5:
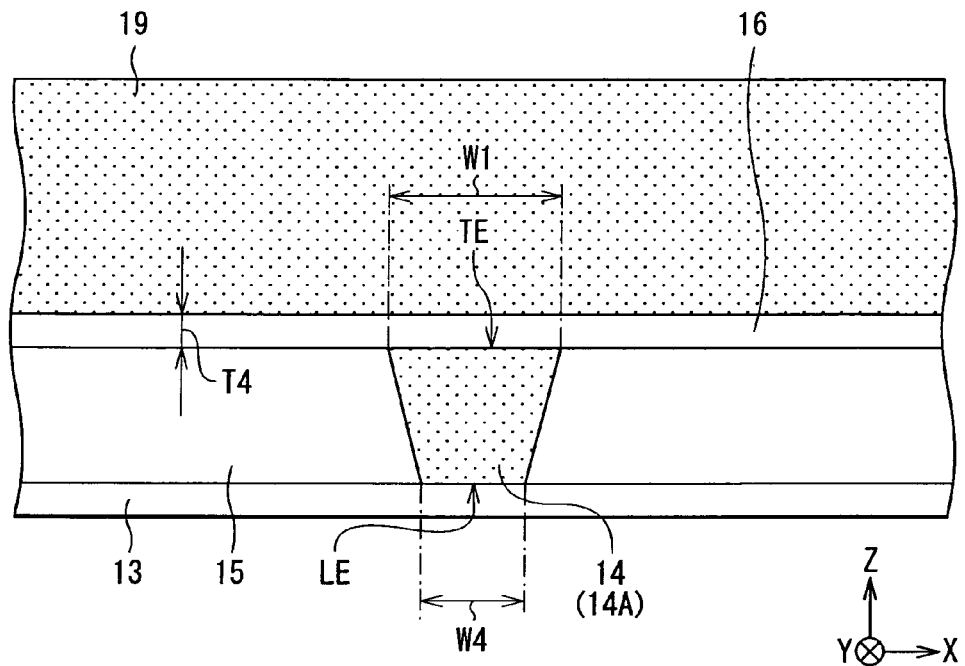
FIG. 5 is a plan view of a thin-film magnetic head in a comparison example, showing the configuration thereof on an air bearing surface.

FIG. 5 shows the configuration in a planar view of the main part of a thin-film magnetic head in a comparison example, and is corresponding to the configuration of FIG. 4. The thin-film magnetic head in this comparison example is of a configuration similar to that of the thin-film magnetic head of the embodiment except that the non-magnetic gap layer 16 (thickness of T4) does not include therein the magnetic layer 17.

In the comparison example, due to a failure in appropriately controlling the amount of magnetic fluxes coming from the tip end portion 14A for capturing into the trailing shield 19 (hereinafter, such an amount is referred to as "capturing amount of magnetic fluxes"), the intensity of the perpendicular magnetic field is in a relationship of "trade-off" with the gradient thereof. More in detail, when the trailing shield 19 is disposed close to the tip end portion 14A, the capturing amount of magnetic fluxes is increased too much, and this indeed increases the gradient of the perpendicular magnetic field in the down-track direction but decreases the intensity thereof. On the other hand, when the trailing shield 19 is disposed away from the tip end portion 14A, the capturing amount of magnetic fluxes is decreased too much, and this indeed increases the intensity of the perpendicular magnetic field but decreases the gradient thereof in the down-track direction. As is known from this, simply adjusting the distance between the tip end portion 14A and the trailing shield 19 (thickness T4 of the non-magnetic gap layer 16) does not easily lead to the increase of both the intensity and gradient of the perpendicular magnetic field.

On the other hand, in the present embodiment, the magnetic field 17 serves to appropriately control the capturing amount of magnetic fluxes so that the above-described relationship of trade-off is terminated. More in detail, the magnetic fluxes from the tip end portion 14A go through the magnetic layer 17 before being captured into the trailing shield 19. As such, the capturing amount of magnetic fluxes is controlled by the magnetic layer 17 not to be increased or decreased too much. As a result, without adjusting the distance between the tip end portion 14A and the trailing shield 19, the perpendicular magnetic field is increased not only in intensity but also in gradient in the down-track direction, whereby the relationship of trade-off is favorably terminated. This thus successfully leads to the increase at the same time both in intensity and gradient for the perpendicular magnetic field.

Especially in the perpendicular magnetic recording mode, as described above, the magnetic fluxes are mainly directed in the vicinity of the trailing edge TE of the tip end portion 14A, and thus the recording process is executed at the trailing edge TE. In such a case, as long as the trailing shield 19 is provided on the trailing side of the tip end portion 14A via the non-magnetic gap layer 16, and as long as the non-magnetic gap layer 16 includes therein the magnetic layer 17, the perpendicular magnetic field is increased both in intensity and gradient in the vicinity of the trailing edge TE being the substantial recording portion, thereby favorably enhancing the effects.

Modified Examples in Terms of Configuration of Thin-Film Magnetic Head

First and Second Modified Examples

Figure 6:
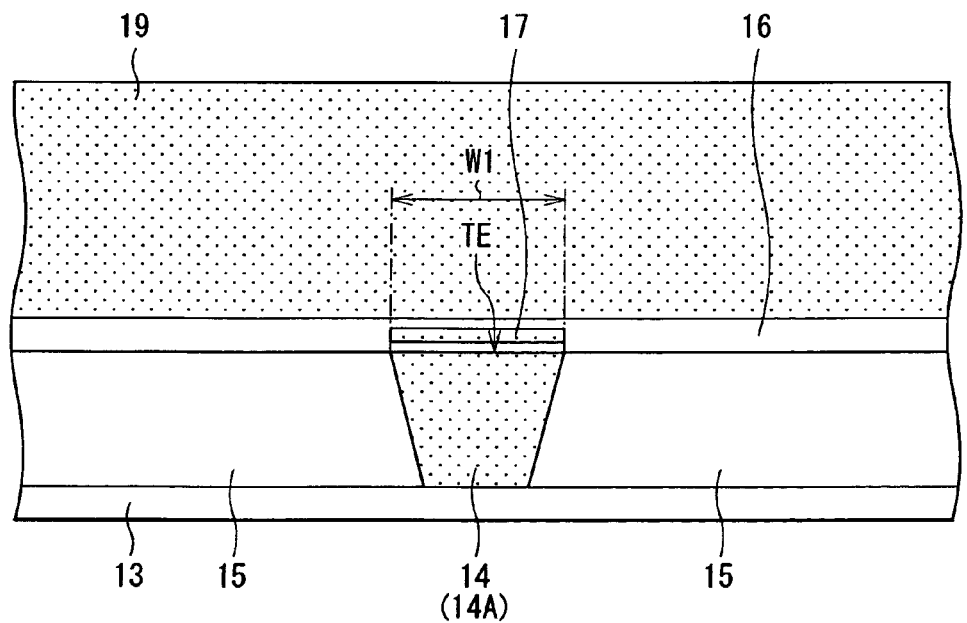
FIG. 6 is a plan view of a thin-film magnetic head in a first modified example, showing the configuration thereof.
Figure 7:
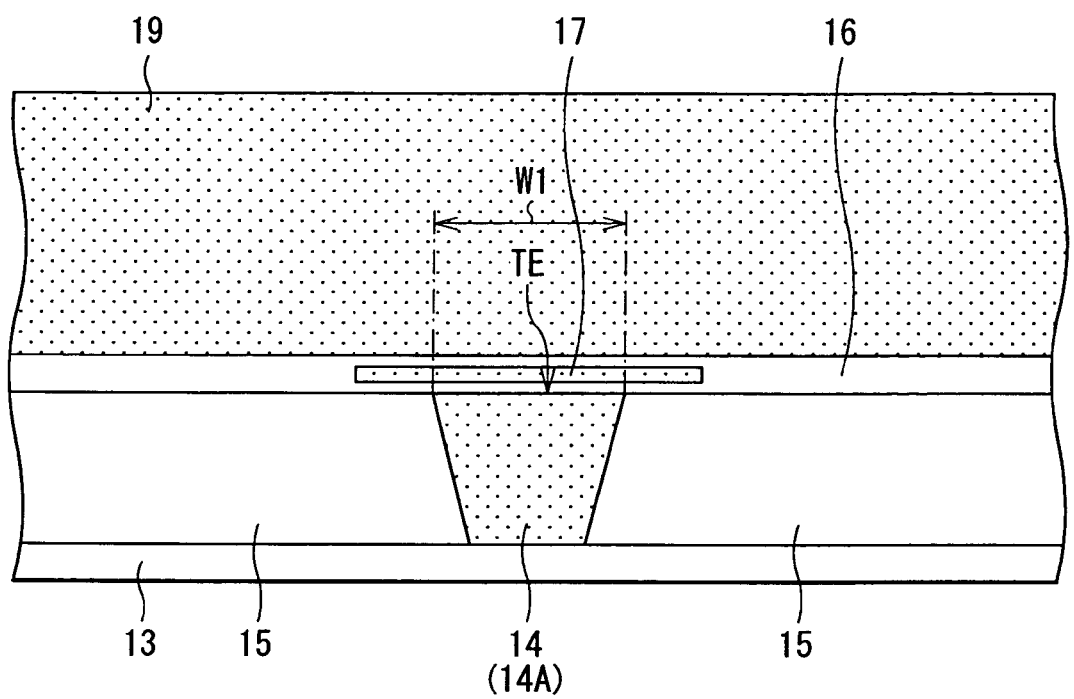
FIG. 7 is a plan view of a thin-film magnetic head in a second modified example, showing the configuration thereof.

In the configuration of FIG. 4, alternatively, the magnetic layer 17 may be disposed differently in the cross-track direction. To be specific, for example, as shown in FIG. 6, the magnetic layer 17 may be disposed only to an area opposing the tip end portion 14A (the trailing edge TE) or as shown in FIG. 7, the magnetic layer 17 may be disposed not only to the area opposing the tip end portion 14A but also to the area in the vicinity thereof. Also in these cases, the magnetic layer 17 serves to control the capturing amount of magnetic fluxes, thereby leading to the effects similar to those achieved in the configuration of FIG. 4. Note herein that if the magnetic layer 17 is disposed to cover a larger area, this results in more divergence of magnetic fluxes in the cross-track direction after being emitted from the tip end portion 14A, and thus the magnetic layer 17 is preferably so disposed as not to cover a too large area.

Third Modified Example

Figures 8A, 8B:
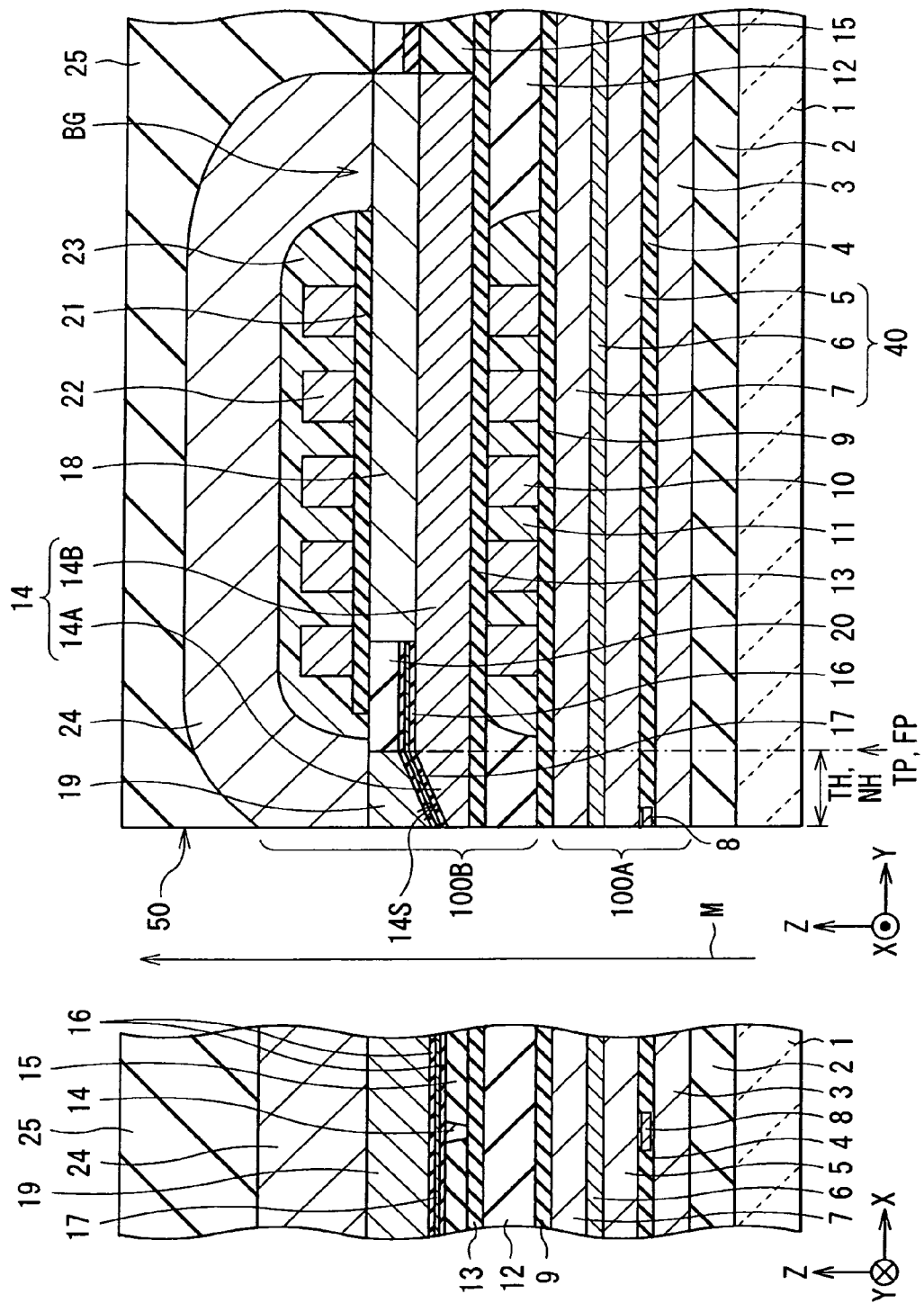
FIGS. 8A and 8B are each a cross-sectional view of a thin-film magnetic head in a third modified example, showing the configuration thereof.

In the configurations of FIGS. 1A and 1B, alternatively, the magnetic layer 17 may be disposed differently in the length direction (Y-axis direction). To be specific, for example, as shown in FIGS. 8A and 8B, the magnetic layer 17 may be disposed not only to the area opposing the tip end portion 14A but also to the area in the rear thereof. Also in these cases, the magnetic layer 17 appropriately serves to control the capturing amount of magnetic fluxes, thereby leading to the effects similar to those achieved in the configuration of FIGS. 1A and 1B.

Fourth Modified Example

Figure 9:
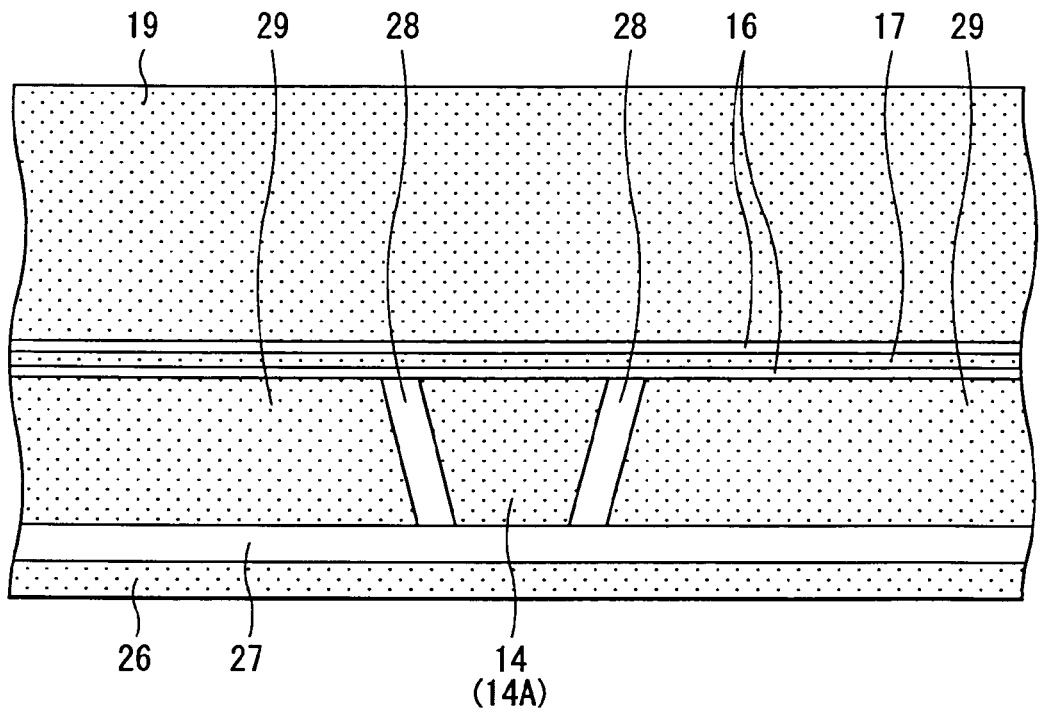
FIG. 9 is a plan view of a thin-film magnetic head in a fourth modified example, showing the configuration thereof.

In the configuration of FIG. 4, alternatively, as shown in FIG. 9, for example, a leading shield 26 may be provided on the leading side of the tip end portion 14A via a non-magnetic gap layer 27, and a pair of side shields 29 may be provided respectively on both sides of the tip end portion 14A in the cross-track direction each via a non-magnetic gap layer 28. The leading shield 26 and the side shields 29 are each a write shield as is the trailing shield 19.

The leading shield 26 serves to capture the magnetic fluxes coming from the main magnetic-pole layer 14 in the vicinity of the air bearing surface 50, and controls the divergence of the magnetic fluxes on the leading side of the main magnetic-pole layer 14. Such a leading shield 26 is made of a material similar to that of the trailing shield 19, and the non-magnetic gap layer 27 is made of a material similar to that of the non-magnetic gap layer 16, for example.

The side shields 29 each serve to capture the magnetic fluxes coming from the main magnetic-pole layer 14 in the vicinity of the air bearing surface 50, and controls the divergence of the magnetic fluxes on both sides of the main magnetic-pole layer 14. The side shields 29 are both made of a material similar to that of the trailing shield 19, and the non-magnetic gap layer 28 is made of a material similar to that of the non-magnetic gap layer 16, for example.

In such an alternative configuration, during recording, a part of the magnetic fluxes (divergence component) emitted from the tip end portion 14A is captured by the leading shield 26 and the side shields 29. This accordingly increases more the gradient of the perpendicular magnetic field not only in the down-track direction by the leading shield 26 but also in the cross-track direction by the side shields 29, thereby favorably enhancing the effects.

In the configuration, the leading shield 26 is not necessarily provided together with the side shields 29, and alternatively, the configuration may include only the leading shield 26 or only the side shields 29.

Fifth Modified Example

Figure 10:
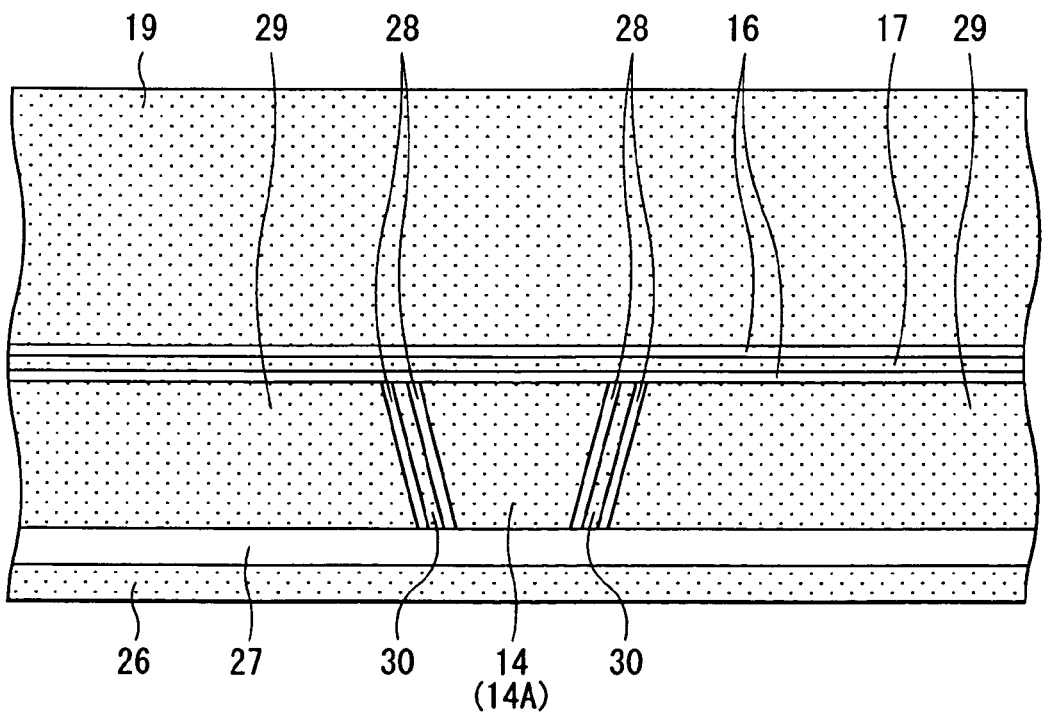
FIG. 10 is a plan view of a thin-film magnetic head in a fifth modified example, showing the configuration thereof.

In the configuration of FIG. 9, alternatively, as shown in FIG. 10, for example, the non-magnetic gap layer 28 may include therein a magnetic layer 30. This magnetic layer 30 serves similar to the magnetic layer 17, and is made of a material similar to that of the magnetic layer 17, for example. If this is the configuration, the magnetic layer 30 provides the effects similar to those achieved with the magnetic layer 17. That is, during recording, the magnetic fluxes emitted from the tip end portion 14A are partially captured into the side shields 29 via the magnetic layer 30 so that the magnetic layer 30 appropriately controls the amount of magnetic fluxes to be captured into the side shields 29. This accordingly increases the gradient of the perpendicular magnetic field in the cross-track direction, thereby favorably enhancing the effects.

Sixth Modified Example

Figure 11:
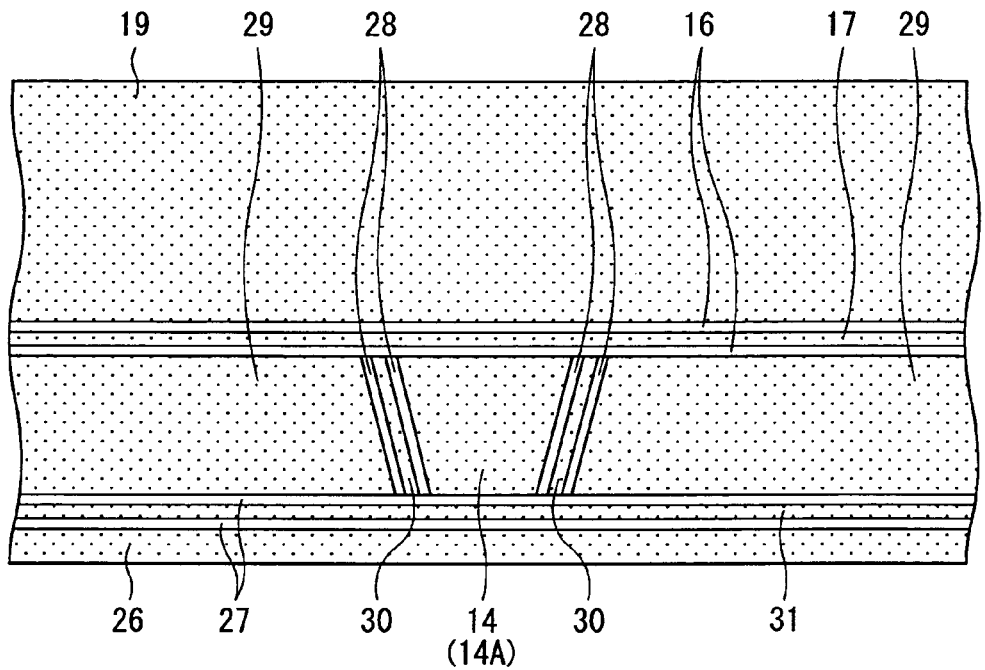
FIG. 11 is a plan view of a thin-film magnetic head in a sixth modified example, showing the configuration thereof.

In the configuration of FIG. 10, alternatively, as shown in FIG. 11, for example, the non-magnetic gap layer 27 may include therein a magnetic layer 31. This magnetic layer 31 serves similar to the magnetic layer 17, and the material and placement range thereof are similar to those of the magnetic layer 17, for example. If this is the configuration, the magnetic layer 31 offers the effects similar to those achieved by the magnetic layer 17. That is, during recording, the magnetic fluxes emitted from the tip end portion 14A are partially captured into the leading shield 26 via the magnetic layer 31 so that the magnetic layer 31 appropriately controls the amount of magnetic fluxes to be captured into the leading shield 26. This accordingly increases more the gradient of the perpendicular magnetic field in the down-track direction, thereby favorably enhancing the effects.

Seventh and Eighth Modified Examples

Figure 12:
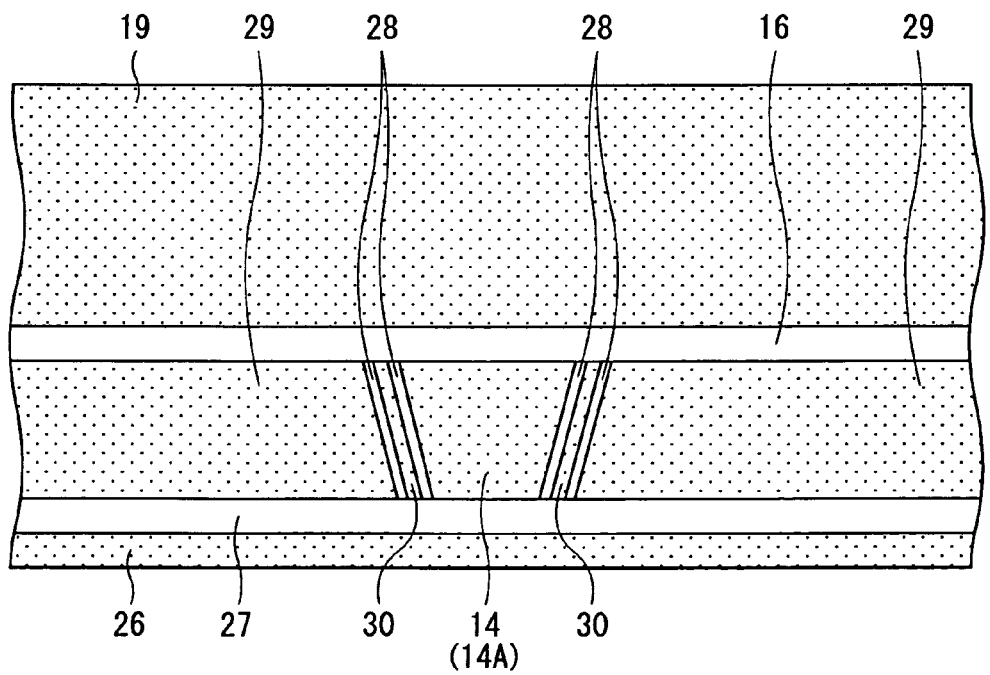
FIG. 12 is a plan view of a thin-film magnetic head in a seventh modified example, showing the configuration thereof.
Figure 13:
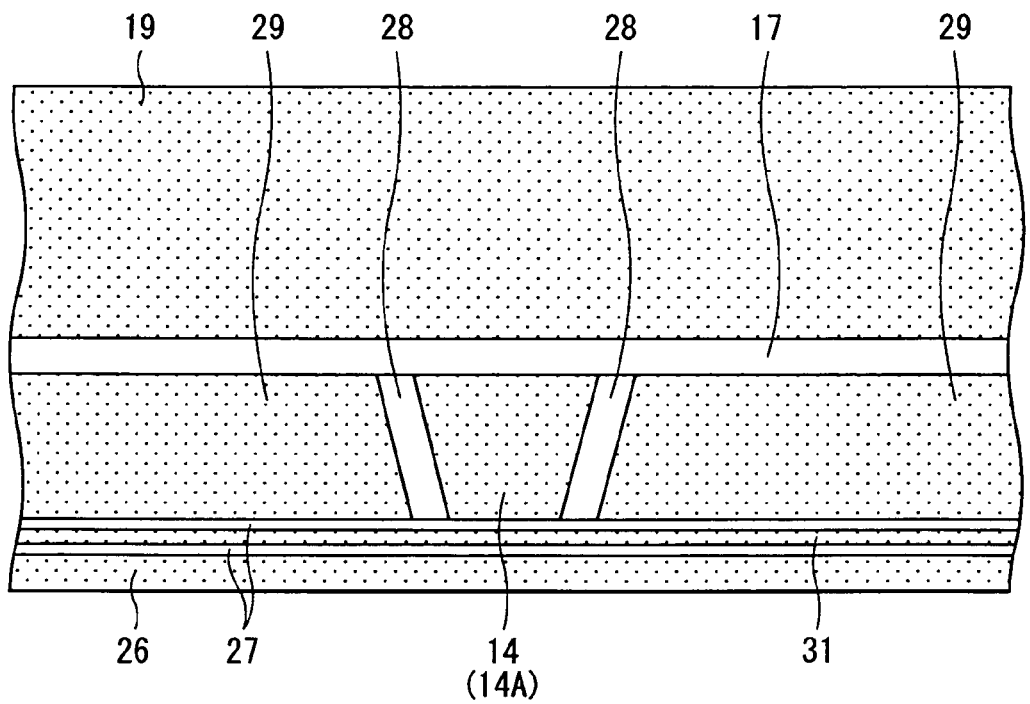
FIG. 13 is a plan view of a thin-film magnetic head in an eighth modified example, showing the configuration thereof.

In the configuration of FIG. 11, alternatively, the magnetic layer 17 may not be provided but only the magnetic layer 30 as shown in FIG. 12, or the magnetic layer 17 may not be provided but only the magnetic layer 31 as shown in FIG. 13, for example. The former configuration accordingly increases more the gradient in the perpendicular magnetic field in the cross-track direction, and the latter configuration accordingly increases more the gradient therein in the down-track direction.

Ninth and Tenth Modified Examples

Figure 14:
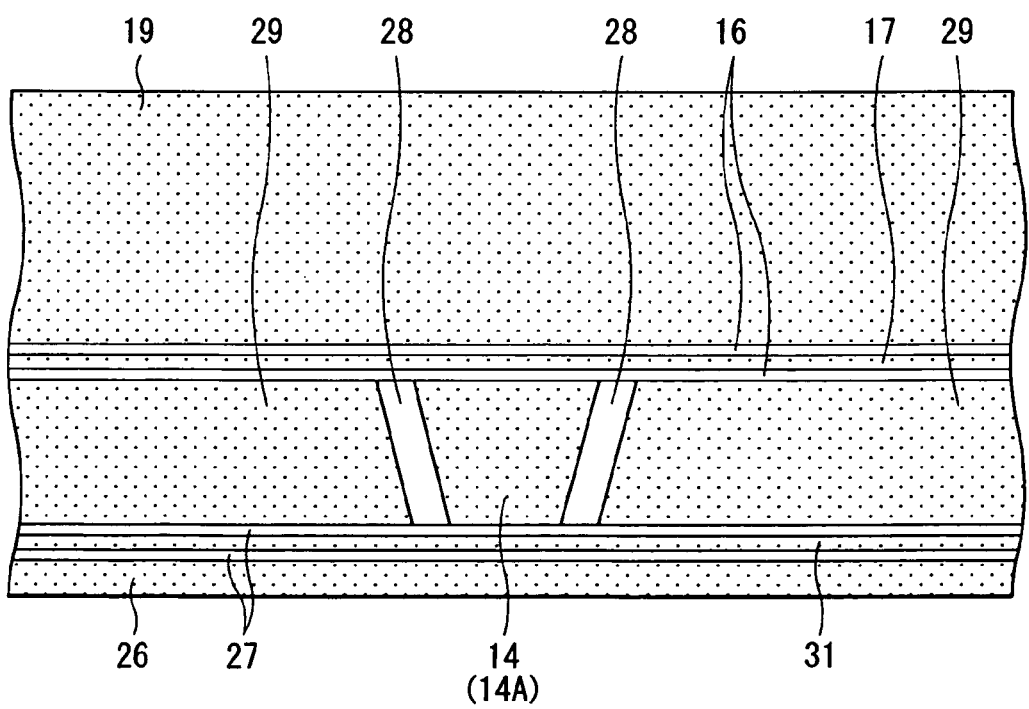
FIG. 14 is a plan view of a thin-film magnetic head in a ninth modified example, showing the configuration thereof.
Figure 15:
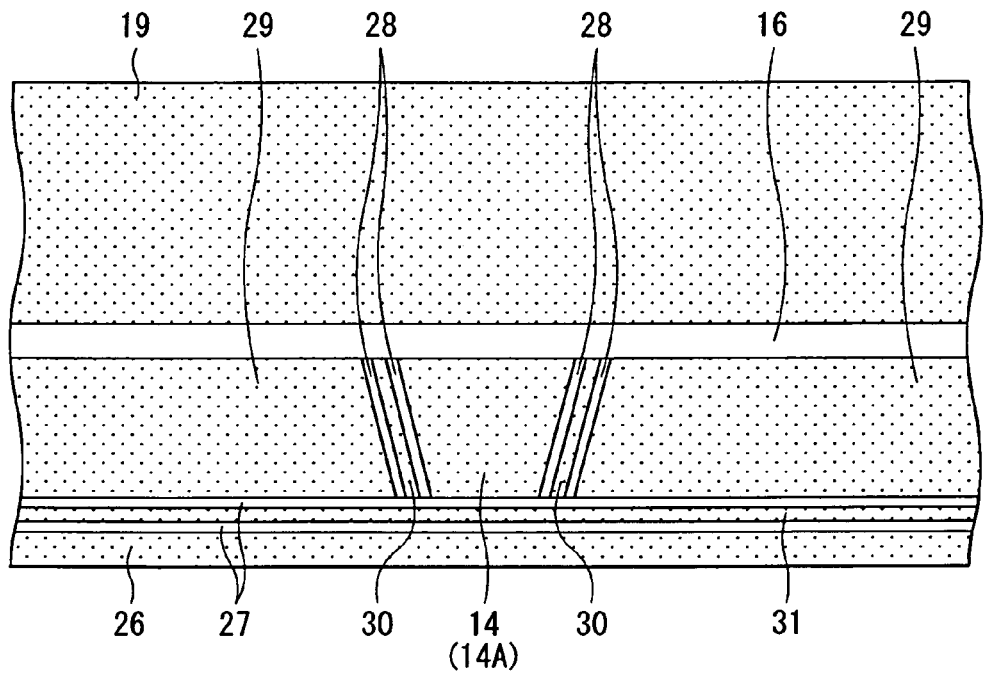
FIG. 15 is a plan view of a thin-film magnetic head in a tenth modified example, showing the configuration thereof.

In the configuration of FIG. 11, alternatively, the magnetic layer 30 may not be provided but only the magnetic layers 17 and 31 as shown in FIG. 14, or the magnetic layer 17 may not be provided but only the magnetic layers 30 and 31 as shown in FIG. 15, for example. The former configuration accordingly increases more the gradient in the perpendicular magnetic field in the down-track direction, and the latter configuration accordingly increases more the gradient therein both in the down-track direction and the cross-track direction.

Eleventh Modified Example

Figure 16:
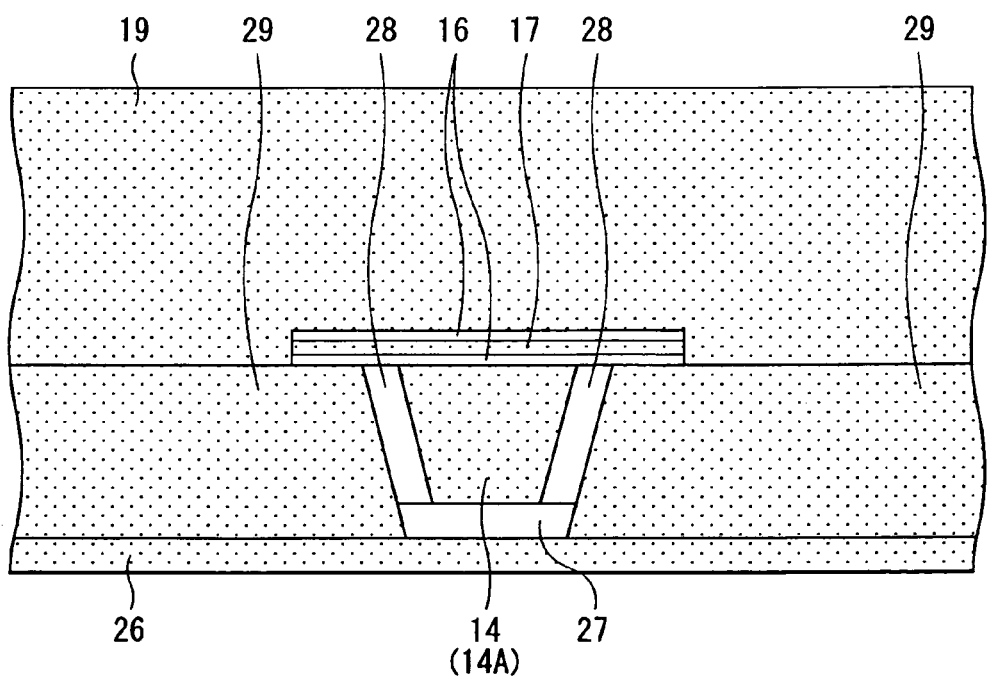
FIG. 16 is a plan view of a thin-film magnetic head in an eleventh modified example, showing the configuration thereof.

Alternatively, the trailing shield 19 may be separated from the side shields 29 or may be coupled thereto. Similarly, the leading shield 26 may be separated from the side shields 29 or may be coupled thereto. To be specific, in the configuration of FIG. 9, alternatively, as shown in FIG. 16, for example, the non-magnetic gap layer 16 and the magnetic layer 17 may be formed smaller in the cross-track direction, and the trailing shield 19 may be formed larger in the down-track direction on both sides of the tip end portion 14A, whereby the trailing shield 19 may be coupled to the side shields 29. Still alternatively, the non-magnetic gap layer 27 may be formed smaller in the cross-track direction, and the side shields 29 may be formed larger in the down-track direction, whereby the leading shield 26 may be coupled to the side shields 29. This configuration also offers the effects similar to those achieved in the configuration of FIG. 9.

Note that, in the configuration of FIG. 16, only either the trailing shield 19 or the leading shield 26 may be coupled to the side shields 29. This eleventh modified example may be applied not only to the configuration of FIG. 9 but also to the configurations of FIGS. 10 to 15.

Configuration of Magnetic Recording Device

Figure 17:
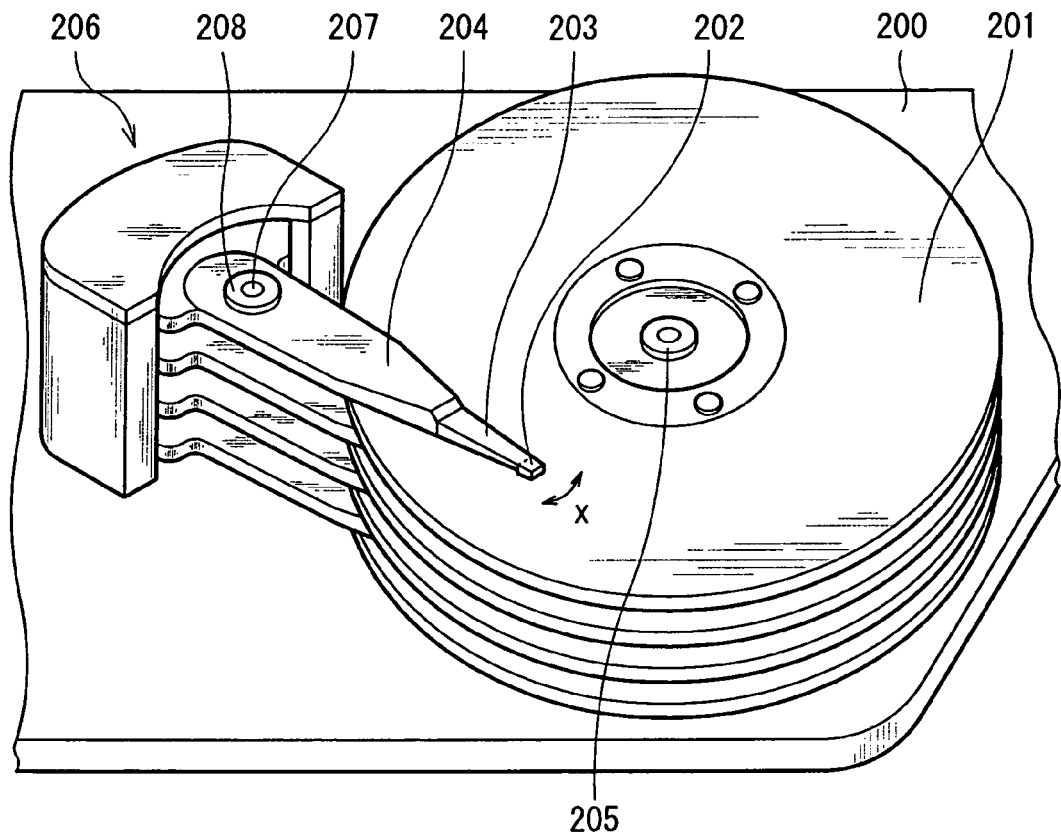
FIG. 17 is a perspective view of a magnetic recording device incorporating a thin-film magnetic head, showing the configuration thereof.
Figure 18:
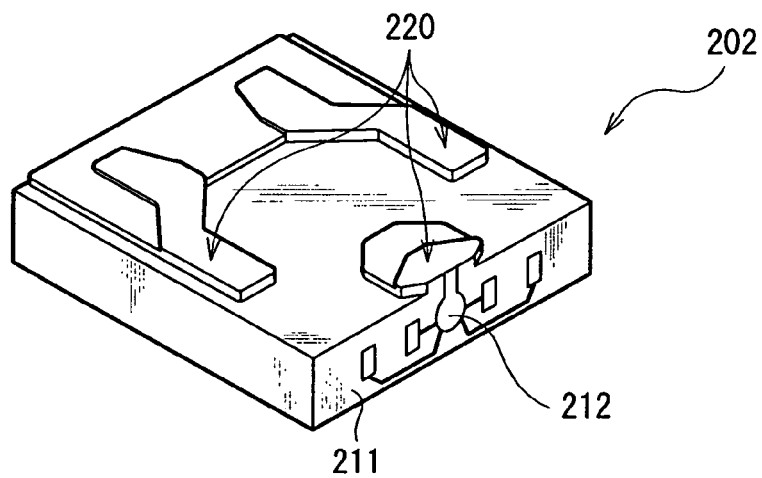
FIG. 18 is an enlarged perspective view of the main part of the magnetic recording device, showing the configuration thereof.

Described next is the configuration of a magnetic recording device incorporating the thin-film magnetic head of the embodiment described above. FIGS. 17 and 18 each show the configuration of the magnetic recording device, specifically, FIG. 17 is a perspective view of the entire configuration thereof, and FIG. 18 is a perspective view of the configuration of the main part thereof.

This magnetic recording device is exemplified by a hard disk drive, and is configured by a chassis 200 as shown in FIG. 17 including therein a plurality of magnetic disks (hard disks) 201 each corresponding to the recording medium 60 (FIG. 3), a plurality of suspensions 203, and a plurality of arms 204. The suspensions 203 are so disposed as to respectively correspond to the magnetic disks 201, and each support its corresponding magnetic head slider 202 at its end portion. The arms 204 are each for supporting the remaining end portion of its corresponding suspension 203. The magnetic disks 201 are each configured to be able to rotate about a spindle motor 205 fixed to the chassis 200. The arms 204 are each connected to a drive section 206 being a power source, and are each configured to be able to swing about a fixed shaft 207 via a bearing 208. The fixed shaft 207 herein is fixed to the chassis 200. The drive section 206 includes a drive source such as voice coil motor. Such a magnetic recording device is of a model in which a plurality of arms 204 may swing all together about the fixed shaft 207, for example. Note that, in FIG. 17, for easy viewing of the internal configuration of the magnetic recording device, the chassis 200 is partially notched.

The magnetic head slider 202 is configured by a thin-film magnetic head 212 attached entirely over one surface of a substrate 211 as shown in FIG. 18, for example. The thin-film magnetic head 212 is the thin-film magnetic head described above, and the substrate 211 is made of a non-magnetic insulation material such as AlTiC, and is substantially a rectangular parallelepiped. On another surface of the substrate 211 (air bearing surface 220) is configured to have bumps and dips for reduction of air resistance to be caused during the swing movement of the arms 204, for example. The surface orthogonal to such an air bearing surface 220 (surface on the front right side in FIG. 18) is the one attached with the thin-film magnetic head 212. The magnetic head sliders 202 are each so configured as to move upward from the recording surface of its corresponding magnetic disk 201 when the magnetic disk 201 rotates during recording or reproduction. Such an upward movement occurs by flow of air generated between the recording surface of the magnetic disk 201 (the surface opposing the magnetic head slider 202), and the air bearing surface 220. Herein, for easy viewing of the configuration of the magnetic head slider 202 on the side of the air bearing surface 220, FIG. 18 shows the upside-down state of the state of FIG. 17.

With such a magnetic recording device, any of the arms 204 is moved to swing during recording or reproduction so that the corresponding magnetic head slider 202 is moved to any predetermined area (recording area) of the corresponding magnetic disk 201. Thereafter, when power is applied to the thin-film magnetic head 212 in the state of opposing the magnetic disk 201, based on the operation principles described above, the thin-film magnetic head 212 subjects the magnetic disk 201 to the recording or reproduction process.

With such a magnetic recording device, the above-described thin-film magnetic head is provided so that the recording capabilities may be favorably improved.

Examples

Next, described in detail are specific examples of the invention.

First of all, using a model of the thin-film magnetic head of the embodiment of the invention (FIG. 4) and that of the comparison example (FIG. 5), a simulation is performed to check the relationship between the intensity H in a perpendicular magnetic field ($10^3/(4\pi)$A/m=Oe), and the gradient G therein in the down-track direction ($[10^3/(4\pi)$A/m]/nm=Oe/nm). The result is as shown in FIG. 19.

For forming the main part of the thin-film magnetic head, a plating film is formed by electrolytic plating for use as the main magnetic-pole layer 14 and the trailing shield 19, and by sputtering, and the coil insulation layer 13, the insulation layer 15, the non-magnetic gap layer 16, and the magnetic layer 17 are formed. In this case, the material for the main magnetic-pole layer 14 and for the trailing shield 19 is alloy of cobalt, nickel, and iron, the material for the coil insulation layer 13, the insulation layer 15, and the non-magnetic gap layer 16 is alumina, and the material for the magnetic layer 17 is alloy of iron and cobalt. In FIGS. 1B, 2, 4, and 5, the components are fixed in size as W1=45 nm, NH=40 nm, T2=15 nm, and T3=15 nm, but are varied as T1, T4=20 nm, 25 nm, or 30 nm. The measurement requirements for the intensity H and the gradient G in the perpendicular magnetic field include "recording current=30 mA", and the intensity H is measured at a position away from the air bearing surface 50 by 8 nm. This position for measurement of the intensity H of the perpendicular magnetic field is assumed as being located on the top surface of the recording medium 60. Note that, in FIG. 19, the white plots represent the invention, and the black plots represent the comparison example.

Figure 19:
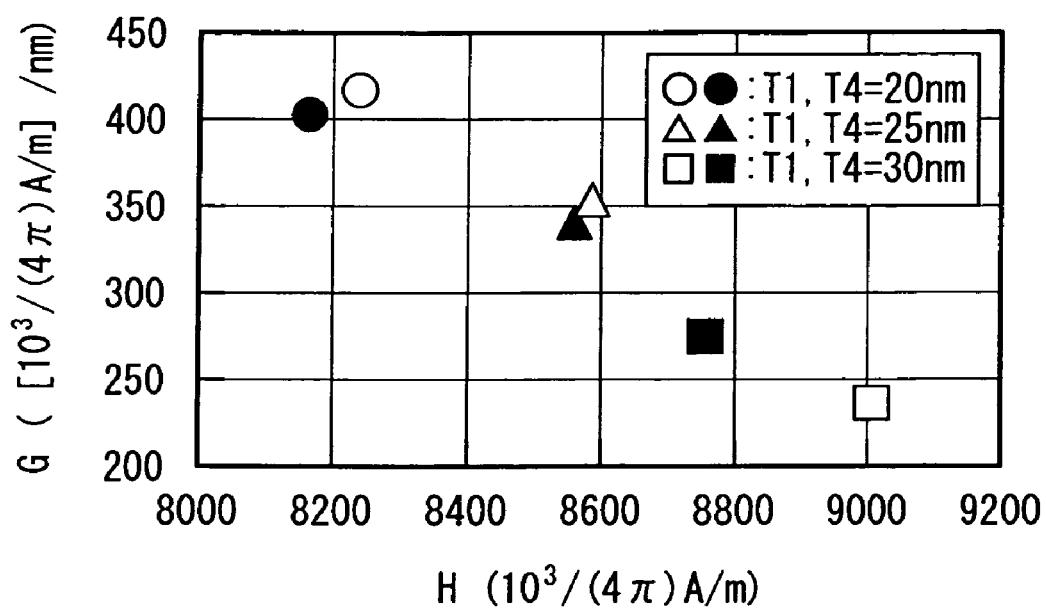
FIG. 19 is a diagram showing the relationship between the intensity of a perpendicular magnetic field and the gradient thereof.

As shown in FIG. 19, the plots (white) of the invention show the movement in the upper right direction compared with the plots (black) of the comparison example. Such a movement indicates that both the intensity H and the gradient G are increased in the embodiment of the invention compared with the comparison example. This tells the favorable increase of, in the embodiment of the invention, not only the intensity in the perpendicular magnetic field but also the gradient therein in the down-track direction.

While the invention has been described with the embodiment, the invention is not restrictive to the foregoing description about the embodiment, and numerous other modifications and variations may be devised. For example, the perpendicular magnetic write head of the embodiment of the invention is applied to a combined head, but this is surely not restrictive, and may be applied to a head specifically for recording use not including a reproduction head section.

What is claimed is:

1. A perpendicular magnetic write head, comprising:
   a magnetic pole and a write shield;
   one or more magnetic layers provided between the magnetic pole and the write shield;
   a first non-magnetic sub-gap layer that separates the one or more magnetic layers from the magnetic pole; and
   a second non-magnetic sub-gap layer that separates the one or more magnetic layers from the write shield.

2. The perpendicular magnetic write head according to claim 1, wherein
   the write shield is at least any one of a trailing shield provided on a trailing side of the magnetic pole, a leading shield provided on a leading side of the magnetic pole, and a pair of side shields provided respectively on both sides of the magnetic pole in a track-width direction.

3. The perpendicular magnetic write head according to claim 2 further comprising a return yoke coupled to the trailing shield on the trailing side, wherein
   the write shield is the trailing shield, and
   the trailing shield is formed separately from the return yoke.

4. The perpendicular magnetic write head according to claim 1, wherein
   the one or more magnetic layers are provided at least in an area opposing the magnetic pole.

5. The perpendicular magnetic write head according to claim 1, wherein
   a total thickness of the non-magnetic sub-gap layers and the one or more magnetic layers, at a position of the one or more magnetic layers, is 300 nm or smaller.

6. A magnetic recording device, comprising:
   a magnetic recording medium;
   a perpendicular magnetic write head having a magnetic pole and a write shield;
   one or more magnetic layers provided between the magnetic pole and the write shield;
   a first non-magnetic sub-gap layer that separates the one or more magnetic layers from the magnetic pole; and
   a second no magnetic sub-gap layer that separates the one or more magnetic layers from the write shield.

* * * * *